United States Patent
Mishina et al.

(10) Patent No.: US 6,886,857 B1
(45) Date of Patent: May 3, 2005

(54) AIRBAG

(75) Inventors: Jyoji Mishina, Tokyo (JP); Yasushi Masuda, Tokyo (JP); Ryosuke Nakanishi, Tokyo (JP)

(73) Assignee: Takata Corporation, Tokyo (JP)

( * ) Notice: Subject to any disclaimer, the term of this patent is extended or adjusted under 35 U.S.C. 154(b) by 458 days.

(21) Appl. No.: 09/644,793

(22) Filed: Aug. 24, 2000

Related U.S. Application Data

(63) Continuation-in-part of application No. 09/318,251, filed on May 25, 1999, now abandoned, and a continuation-in-part of application No. 09/342,171, filed on Jun. 29, 1999, now abandoned.

(30) Foreign Application Priority Data

| Jun. 1, 1998 | (JP) | H10-151397 |
| Apr. 23, 1999 | (JP) | H11-116817 |
| May 28, 1999 | (JP) | H11-150106 |

(51) Int. Cl.$^7$ ............................................. B60R 21/28
(52) U.S. Cl. ................................ 280/743.1; 280/739
(58) Field of Search .................. 280/728.1, 743.1, 280/743.2, 739, 728.2, 729

(56) References Cited

U.S. PATENT DOCUMENTS

| 5,501,488 | A | * | 3/1996 | Saderholm et al. | 280/739 |
| 5,538,280 | A | * | 7/1996 | Gray et al. | 280/743.1 |
| 5,653,464 | A | * | 8/1997 | Breed et al. | 280/743.1 |
| 5,803,495 | A | * | 9/1998 | Jackson et al. | 280/743.1 |
| 5,863,625 | A | * | 1/1999 | Chiou | 428/36.1 |
| 5,931,497 | A | * | 8/1999 | Fischer | 280/743.1 |
| 5,944,345 | A | * | 8/1999 | Hirai | 280/743.1 |
| 6,299,199 | B1 | | 10/2001 | Bowers et al. | |

FOREIGN PATENT DOCUMENTS

| JP | 2-175456 | 7/1990 |
| JP | 2-279442 | 11/1990 |
| JP | 2-299952 | 12/1990 |
| JP | 4-362442 | 12/1992 |
| JP | 7-309186 | 11/1995 |
| JP | 8-104194 | 4/1996 |
| JP | 8-310325 | 11/1996 |
| JP | 8-333456 | 12/1996 |
| JP | 9-58387 | 3/1997 |
| JP | 9-506667 | 6/1997 |
| JP | 10-72738 | 3/1998 |
| JP | 10-102029 | 4/1998 |
| JP | 10-129380 | 5/1998 |
| WO | 98/19894 | 5/1998 |

OTHER PUBLICATIONS

JIS Dictionary of Industries Terms, Third edition, by Japanese Standards Associateion.
Dictionary of Scientific and Technical Terms, Second edition, by McGraw–Hill.

* cited by examiner

*Primary Examiner*—Michael Cuff
(74) *Attorney, Agent, or Firm*—Manabu Kanesaka

(57) ABSTRACT

An airbag is provided which securely prevents gas leakage through seams between panels and has excellent productivity. The airbag 10 has panels 1, 2. Peripheral portions of the panels 1, 2 are bonded with silicone adhesive 5 and also sewn together by sewing yarns 6A, 6B. Seams of the sewing yarns 6A, 6B may be coated by silicone sealant. The sewing yarn 6A composing an inner seam is thinner than the sewing yarn 6B composing an outer seam so that the sewing yarn 6A is broken during the inflation of the airbag 10, thereby absorbing energy.

14 Claims, 4 Drawing Sheets

AIRBAG

CROSS REFERENCE TO RELATED APPLICATION

This is a continuation-in-part application of patent application Ser. No. 09/318,251 filed on May 25, 1999, abandoned, and Ser. No. 09/342,171 filed on Jun. 29, 1999, abandoned.

BACKGROUND OF THE INVENTION AND RELATED ART STATEMENT

The present invention relates to an airbag for an airbag device installed in a vehicle and an aircraft and, more particularly, to an airbag where gas is prevented from leaking from seams between panels.

A vehicle airbag for an automobile, such as a driver's airbag, a front passenger's airbag, a rear passenger's airbag, and a side airbag, or an airbag for an aircraft, has a plurality of panels which are sewn together in a bag-like configuration. The airbag is inflated by gas supplied from an inflator.

An airbag which requires to retain its internal pressure for a long time is desired to extremely prevent gas leakage through seams. Such an airbag is for example a side airbag (of a curtain type) for protecting a head of an occupant and a side airbag for coping with roil over.

In order to prevent the gas leakage through the seams between the panels, as shown in FIGS. 4a, 4b, silicone tapes 4 are attached along peripheries of panels 1', 2' to cover a seam 3' of the panels 1', 2'.

In the conventional air bag in FIGS. 4a, 4b, the silicone tapes 4 must be attached to the both surfaces of the airbag, thereby increasing the labor and impairing the productivity. When high pressure gas is introduced into the airbag, there is a possibility of gas leakage through a clearance between the panels 1', 2' as shown in an arrow G in FIG. 4b. Therefore, the amount of gas to be supplied by the inflator must be increased in consideration of the amount of gas leakage, so the capacity of the inflator should be large.

OBJECT AND SUMMARY OF THE INVENTION

An object of the present invention is to provide an airbag where gas is prevented from leaking at seams between panels and which has excellent productivity.

An airbag of the present invention has a first panel and a second panel, peripheral portions of which are connected to each other by sewing by yarn and bonding by elastic adhesive.

The elastic adhesive has preferably elongation of more than 200%, more preferably of 200 to 1000%. The elastic adhesive may be one of silicone adhesive, urethane adhesive, nitrile rubber adhesive, and polysulfide adhesive. Silicone room temperature vulcanizing adhesive is preferable as the silicone adhesive.

If the panel is coated with a silicone coating for prevention of gas leakage through the panel, the elastic adhesive is preferably silicone adhesive. If the panel is coated with an urethane coating, the elastic adhesive is preferably urethane adhesive.

The airbag of the present invention has little or no gas leakage, since the first panel and the second panel are not only sewn together but also bonded by the elastic adhesive along their peripheries. When the panels are sewn together after bonding the panels with the elastic adhesive, the panels are prevented from slipping to each other during the sewing operation, thus improving the sewing workability. The sewing yarns seaming the panels through the elastic adhesive are prevented by the elastic adhesive from coming into contact directly with gases from the inflator.

The seams may include a first seam positioned outside and a second seam positioned inside, and sewing yarn for the second seam may be thinner than sewing yarn for the first seam. The sewing yarn for the second seam positioned inside is broken during the inflation of the airbag so as to partially absorb energy of gas pressure. This energy absorption reduces the impact applied to the sewing yarn for the first seam positioned outside during the inflation of the airbag.

The seam of the panels may be covered by elastic sealant, thereby preventing the gas leakage at the stitches. The sealant is preferably silicone or urethane sealant. If the panel is coated with silicone coating, the sealant is preferably silicone sealant. If the panel is coated with urethane coating, the sealant is preferably urethane sealant.

The thickness of the elastic adhesive may be even or uneven. The elastic adhesive is preferable to have a larger thickness at a portion where a larger stress is applies than another portion, whereby the elastic adhesive stretches according to the stress.

The elastic adhesive may be adhered not only to the peripheral portions of the panels where they are sewn each other but also to the neighborhood thereof inside in the airbag, so that the elastic adhesive in the neighborhood peels and absorbs stress applied thereto when the airbag is inflated.

The elastic adhesive is preferable to be as flexible as possible so that the airbag becomes easy to be folded with a small bending resistance of the airbag whereby reducing a packaging volume of the airbag.

The elastic adhesive adhered to the airbag is preferable to be hardened rapidly in an oven with a short time. The elastic adhesive is preferably of one-can type in this case.

The elastic adhesive may be partially applied to the airbag, and each portion of the elastic adhesive may have a configuration like a column. The column of the elastic adhesive prevents air from remaining in the hardened elastic adhesive which bonds the panels.

BRIEF DESCRIPTION OF THE DRAWINGS

FIG. 4b is an enlarged view of a section taken along a line IVB—IVB of FIG. 4a;

FIG. 7b is an enlarged view of a VIIB part of FIG. 7a.

DETAILED DESCRIPTION OF PREFERRED EMBODIMENTS

Hereinafter, embodiments of the present invention will be described with reference to the attached drawings.

Figure 1A:
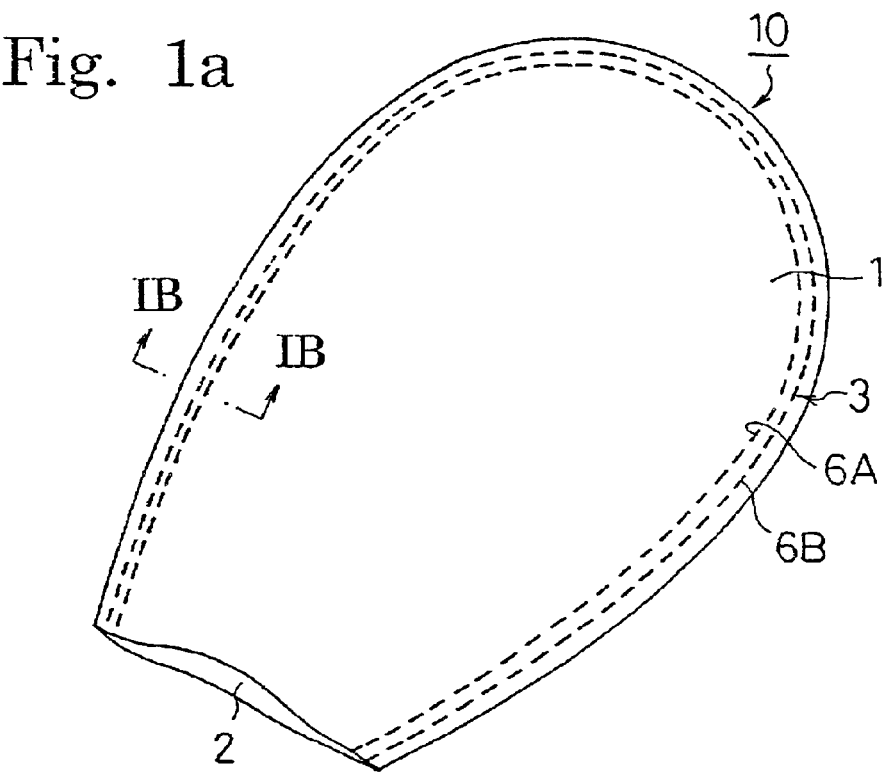
FIG. 1a is a perspective view showing an embodiment of an airbag according to the present invention.
Figure 1B:
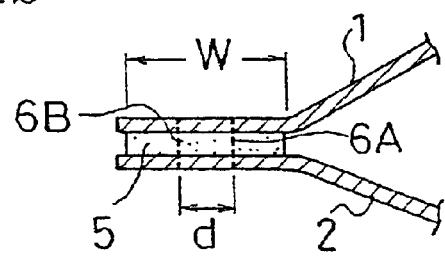
FIG. 1b is an enlarged sectional view taken along a line IB—IB of FIG. 1a, FIG. 1c is an enlarged sectional view of a part of the peripheries of the airbag when inflated.
Figure 1C:
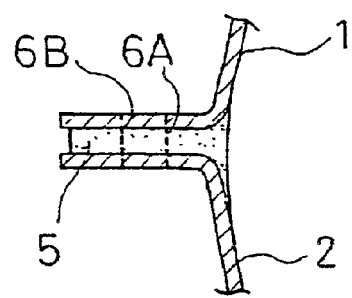

FIG. 1a is a perspective view showing an embodiment of an airbag according to the present invention, FIG. 1b is an enlarged sectional view taken along a line IB—IB of FIG. 1a, FIG. 1c is a sectional view of the same part shown in FIG. 1b when the airbag is inflated and deployed.

Though an airbag 10 shown in FIGS. 1a–1c is a side airbag for an automobile, it should be understood that the present invention is not limited thereto and may be applied to automobile airbags for a driver's seat, a front passenger's seat, and a rear passenger's seat and also to an airbag for an aircraft.

Figure 2:
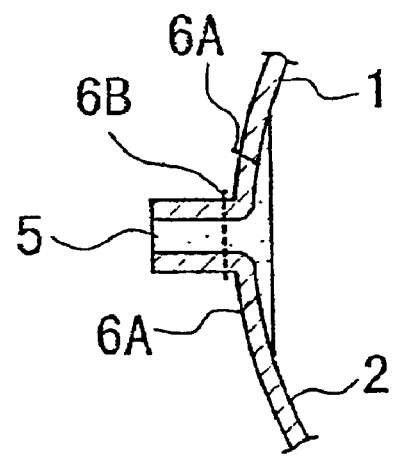
FIG. 2 is an enlarged sectional view of the part of the peripheries of the airbag when fully inflated.

The airbag 10 has a first panel 1 and a second panel 2 which are sewn together along peripheries thereof. The peripheries of the first and second panels 1, 2 are bonded by elastic adhesive 5 such as silicone or urethane adhesive and sewn together by sewing yarns 6A, 6B. During the inflation of the airbag 10, as shown in FIG. 1c and FIG. 2, the elastic adhesive 5 stretches following the panels 1, 2 which move apart from each other. The adhesive 5 stretches with being adhered to the panels 1, 2, thereby preventing the gas leakage through a clearance between the panels 1, 2.

The elastic adhesive 5 is applied along the peripheries of the panels 1, 2 over a width W from 5 mm to 15 mm (as shown in FIG. 1b) with an amount from 0.01 g/cm² to 0.05 g/cm².

The panels 1, 2 are preferably made of woven fabric of synthetic resin. The inner surfaces of the panels 1, 2 may be coated with a silicone or urethane coating for filling. If the panel is coated with a silicone coating for prevention of gas leakage through the panel, the elastic adhesive is preferably silicone adhesive. If the panel is coated with an urethane coating, the elastic adhesive is preferably urethane adhesive. When the elastic adhesive matches with the coating on the panel, the panels 1,2 are bonded strongly by the elastic adhesive.

In this embodiment, the panels 1, 2 are sewn together along two stitching lines by two sewing yarns 6A, 6B. The inner one of the stitching lines is made with the sewing yarn 6A which is relatively thin to make a second seam and the outer one is made with the sewing yarn 6B which is relatively thick to make a first seam.

According to the airbag which is sewn along the two stitching lines of the peripheries, as shown in FIG. 2, the relatively thin sewing yarn 6A composing the inner stitching line is broken by the pressure of gas supplied from an inflator, thereby partially absorbing the energy of the gas pressure which is exerted on a connection of the panels 1, 2 in the stripping direction. Therefore, the impact exerted in such a direction as to break the first seam composed of the sewing yarn 6B can be reduced, thereby further securely preventing the gas leakage at the connection of the panels 1, 2.

The relatively thin sewing yarn 6A composing the inner stitching line preferably has fineness about 210–420 d (deniers) and the relatively thick sewing yarn 6B composing the outer stitching line preferably has fineness about 840–1260 d. The first seam by the sewing yarn 6B is preferably located apart from the peripheral edges of the panels 1, 2 by a distance about 10–18 mm and the distance (d in FIG. 1b) between the yarn 6B and the yarn 6A is preferably about 2–5 mm.

The airbag 10 can be made by superposing the panels 1, 2 having a portion to be sewn to which the elastic adhesive 5 is applied and, after that, sewing up them with the sewing yarns 6A, GB. Since the panels 1, 2 are bonded to each other by the elastic adhesive 5, the panels 1, 2 are prevented from slipping to each other during the sewing, thereby improving the sewing workability.

Though the two sewing yarns are used to stitch the double seams in the airbag shown in FIGS. 1a, 1b, 1c, the sewing may be made by using only one sewing yarn. In this case, a sewing yarn having fineness about 840–1260 d is preferably used and a portion along and apart from the peripheral edges of the panels by a distance 10–20 mm is preferably stitched.

Figure 3:
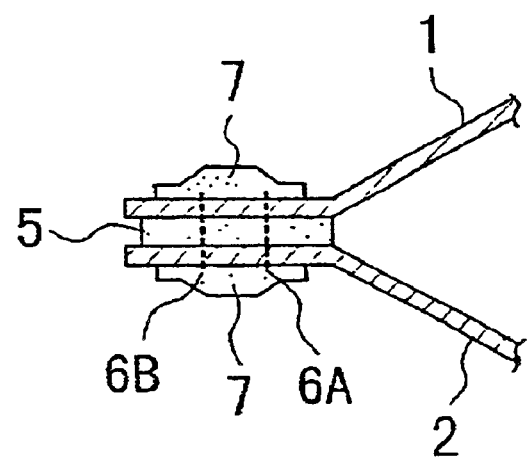
FIG. 3 is a sectional view of a part of the peripheries of an airbag according to another embodiment.
Figure 4A:
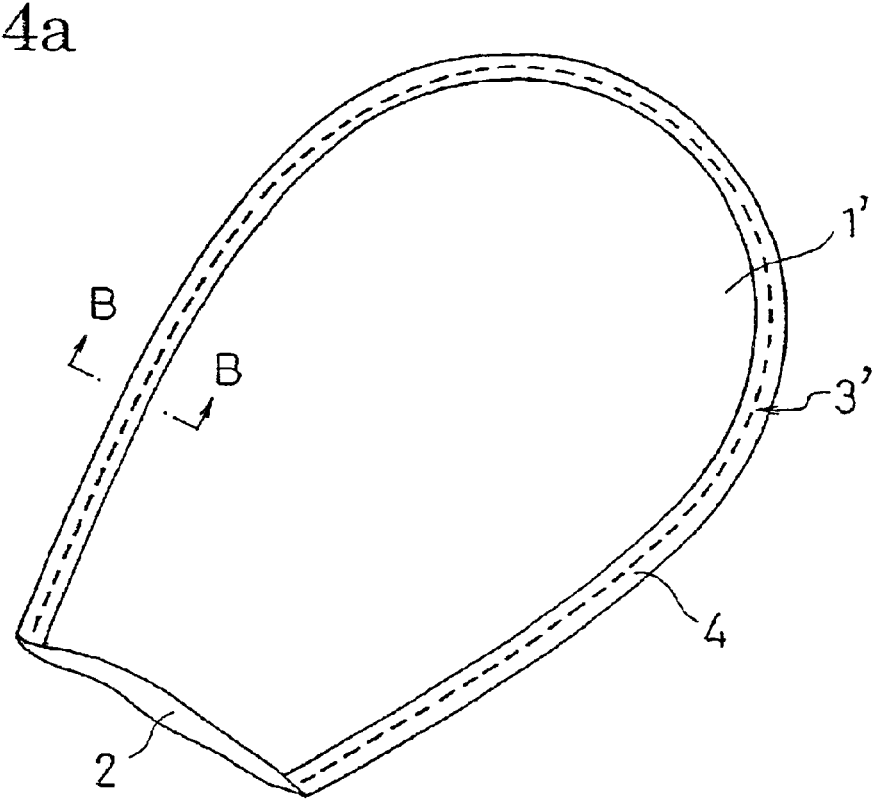
FIG. 4a is a perspective view showing a conventional airbag.
Figure 4B:
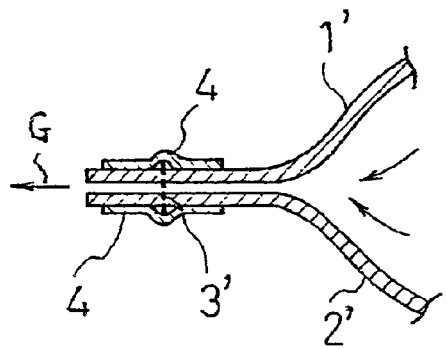

As shown in FIG. 3, silicone or urethane sealant 7 may be applied to the peripheral edges of the panels 1, 2 to cover the stitching lines of the sewing yarns 6A, 6B. Applying the sealant 7 prevents the gas leakage from the stitching.

FIGS. 5 through 7b show an airbag for protecting the head of an occupant which is disposed along a roof-side member above an automobile door. This airbag 20 has two panels 21, 22 which are connected to each other by elastic adhesive 26 such as silicone or urethane adhesive and sewing yarns 23, 24. The airbag 20 comprises a gas introducing portion 25 to be disposed along an A pillar or a C pillar of the automobile. Gas from a gas generator is introduced into the airbag 20 through an opening 25a at a tip of the gas introducing portion 25. The sewing yarn 23 is stitched to connect the peripheral portions of the panels 21, 22 and the sewing yarn 24 is stitched to connect the middle portions of the panels 21, 22. The airbag 20 expands from the roof side to an upper portion of the door so as to receive the head of the occupant. The airbag 20 is sewn together at the middle portions of the panels 21, 22 in order to restrain the thickness (T in FIG. 7a) of the inflated airbag 20 to a predetermined value.

The form of sewing the panels 21, 22 along the peripheral portions of the panels 21, 22 is the same as that shown in FIG. 1b, that is, the peripheral portions of the panels 21, 22 are bonded with the elastic adhesive 26 such as silicone or urethane adhesive and sewn up along two stitching lines by sewing yarns, but the illustration is omitted. One of the sewing yarns composing the inner stitching line is thinner than the other one of the sewing yarns composing the outer stitching line.

Figure 7A:
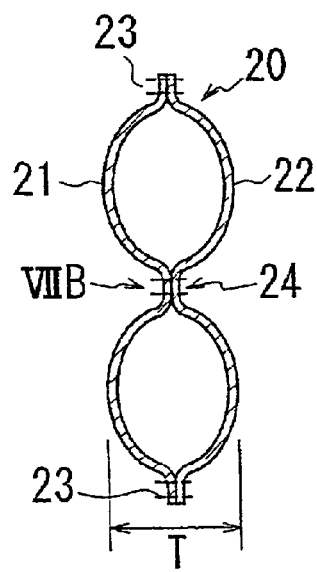
FIG. 7a is a sectional view taken along a line VIIA—VIIA of FIG. 6.
Figure 7B:
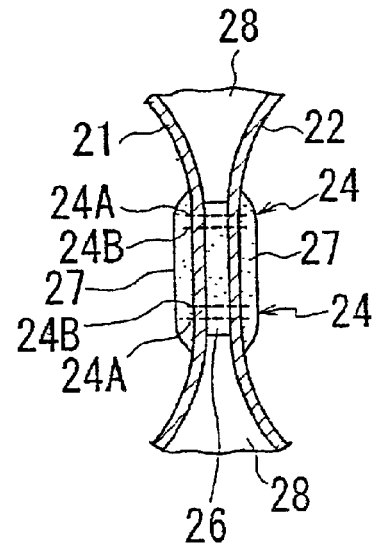

At the middle portions of the panels 21, 22, as shown in FIG. 7b, the panes 21, 22 are bonded with the elastic adhesive 26 and sewn up by the sewing yarn 24 to each other. The sewing yarn 24 comprises a thin yarn 24A and a thick yarn 24B. The yarn 24A is positioned close to an inner chamber 28 of the airbag 20 as compared to the yarn 24B. Therefore, during the inflation of the airbag 20, the thin yarn 24A is broken in the same manner as the case of FIG. 2, thereby partially absorbing the energy applied to the connection of the panels 21, 22 in the stripping direction. As a result of this, the impact in the stripping direction applied to the seam made by the sewing yarn 24B is reduced.

Figure 5:
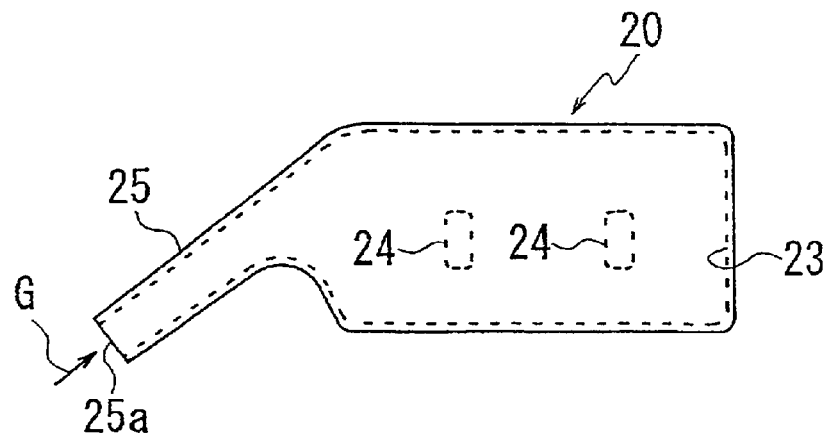
FIG. 5 is a side view of an airbag according to another embodiment.
Figure 6:
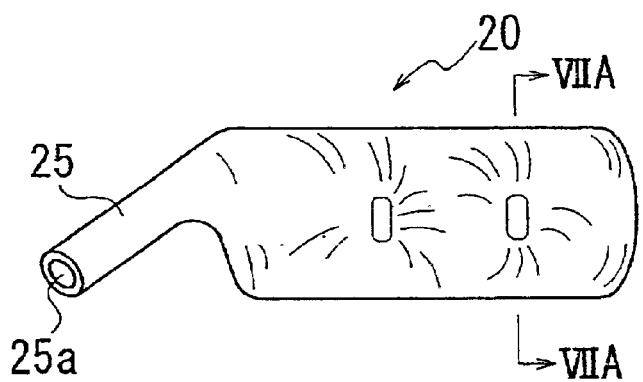
FIG. 6 is a perspective view of the airbag shown in FIG. 5 when inflated.

Though the two sewing yarns 24A, 24B having different thickness are used in the embodiment of FIGS. 5–7, only one stitching line may be provided.

As mentioned above, the present invention provides an airbag which can securely prevent the gas leakage from the connection between the panels and has excellent productivity.

The disclosure of application Ser. No. 09/318,251 filed on May 25, 1999 and Ser. No. 09/342,171 filed on Jun. 29, 1999 is herein incorporated.

What is claimed is:

1. An airbag comprising:
   a first panel and a second panel, which have peripheral portions having inner surfaces facing and connected to each other,
   elastic adhesive disposed between the inner surfaces of the first and second panels at the peripheral portions to connect the first and second panels, and a yarn sewed along the peripheral portions within a range of the width of the elastic adhesive to connect the first and second panels together with the elastic adhesive so that when the first and second panels are pulled in inflating the airbag, the adhesive is pulled outwardly to absorb an expansion force, said yarn comprising a first seam positioned outside and a second seam positioned inside relative to a center of the first and second panels, a sewing yarn for the second seam being thinner than a sewing yarn for the first seam.

2. The airbag as claimed in claim 1, wherein said elastic adhesive has elongation of more than 200%.

3. The airbag as claimed in claim 1, wherein said elastic adhesive is silicone adhesive.

4. The airbag as claimed in claim 1, wherein said elastic adhesive is urethane adhesive.

5. The airbag as claimed in claim 1, wherein at least one of said panels is coated with a silicone coating, and said adhesive is silicone adhesive.

6. The airbag as claimed in claim 1, wherein at least one of said panels is coated with a urethane coating, and said adhesive is urethane adhesive.

7. The airbag as claimed in claim 1, wherein the thickness of the elastic adhesive is uneven.

8. The airbag as claimed in claim 1, wherein the sewing yarn for the second seam is broken during inflation of the airbag so as to partially absorb energy of gas pressure.

9. The airbag as claimed in claim 1, further comprising sealant to cover the yarn on the peripheral portions of the panels.

10. The airbag as claimed in claim 1, wherein an amount of the elastic adhesive to be applied is from 0.01 g/cm$^2$ to 0.05 g/cm$^2$.

11. The airbag as claimed in claim 1, wherein the elastic adhesive is room temperature vulcanizing silicone rubber.

12. The airbag as claimed in claim 1, wherein the panels are made of synthetic resin woven fabrics.

13. The airbag as claimed in claim 1, wherein said adhesive stretches with being adhered to the respective panels.

14. The airbag as claimed in claim 1, wherein the elastic adhesive has a larger thickness at a portion where a larger stress is applies than another portion, whereby the elastic adhesive stretches according to the stress.

* * * * *